United States Patent
Kostorz et al.

(10) Patent No.: US 12,222,737 B2
(45) Date of Patent: Feb. 11, 2025

(54) EXPANSION MATERIAL ELEMENT FOR A THERMOSTATIC MIXING VALVE

(71) Applicant: Grohe AG, Hemer (DE)

(72) Inventors: Ole Benedikt Kostorz, Menden (DE); Björn Riedel, Bochum (DE); Jens Reunert, Witten (DE)

(73) Assignee: GROHE AG, Hemer (DE)

( * ) Notice: Subject to any disclaimer, the term of this patent is extended or adjusted under 35 U.S.C. 154(b) by 0 days.

(21) Appl. No.: 17/912,193

(22) PCT Filed: Feb. 19, 2021

(86) PCT No.: PCT/EP2021/054176
§ 371 (c)(1),
(2) Date: Sep. 16, 2022

(87) PCT Pub. No.: WO2021/185529
PCT Pub. Date: Sep. 23, 2021

(65) Prior Publication Data
US 2024/0295887 A1 Sep. 5, 2024

(30) Foreign Application Priority Data
Mar. 18, 2020 (DE) .......................... 102020107422.0

(51) Int. Cl.
*G05D 23/02* (2006.01)
(52) U.S. Cl.
CPC .................. *G05D 23/022* (2013.01)
(58) Field of Classification Search
CPC ............................ F16K 17/383; G05D 23/022
See application file for complete search history.

(56) References Cited

U.S. PATENT DOCUMENTS

| 6,764,020 B1* | 7/2004 | Zhao | G05D 23/30 |
| | | | 123/41.1 |
| 2007/0075152 A1* | 4/2007 | Guterman | G05D 23/022 |
| | | | 236/93 R |
| 2011/0197579 A1 | 8/2011 | Wahler et al. | |
| 2018/0156346 A1* | 6/2018 | Lamb | F16K 31/002 |

FOREIGN PATENT DOCUMENTS

| DE | 10 2010 008 496 | 8/2011 |
| EP | 1 475 685 | 11/2004 |
| EP | 1 881 310 | 1/2008 |

OTHER PUBLICATIONS

International Search Report dated May 6, 2021 in International (PCT) Application No. PCT/EP2021/054176.

* cited by examiner

*Primary Examiner* — P. Macade Nichols
(74) *Attorney, Agent, or Firm* — Wenderoth, Lind & Ponack, L.L.P.

(57) ABSTRACT

An expansion material element (1) for a thermostatic mixing valve (2), having an expansion material (3) comprising at least one additive (4) from the group below:
synthetic graphite,
highly conductive graphite having a thermal conductivity of at least 350W/(m×K),
boronnitride;
a thermostatic mixing valve (2) having such an expansion material element (1); and a sanitary faucet (8) having such a thermostatic mixing valve (2).

6 Claims, 2 Drawing Sheets

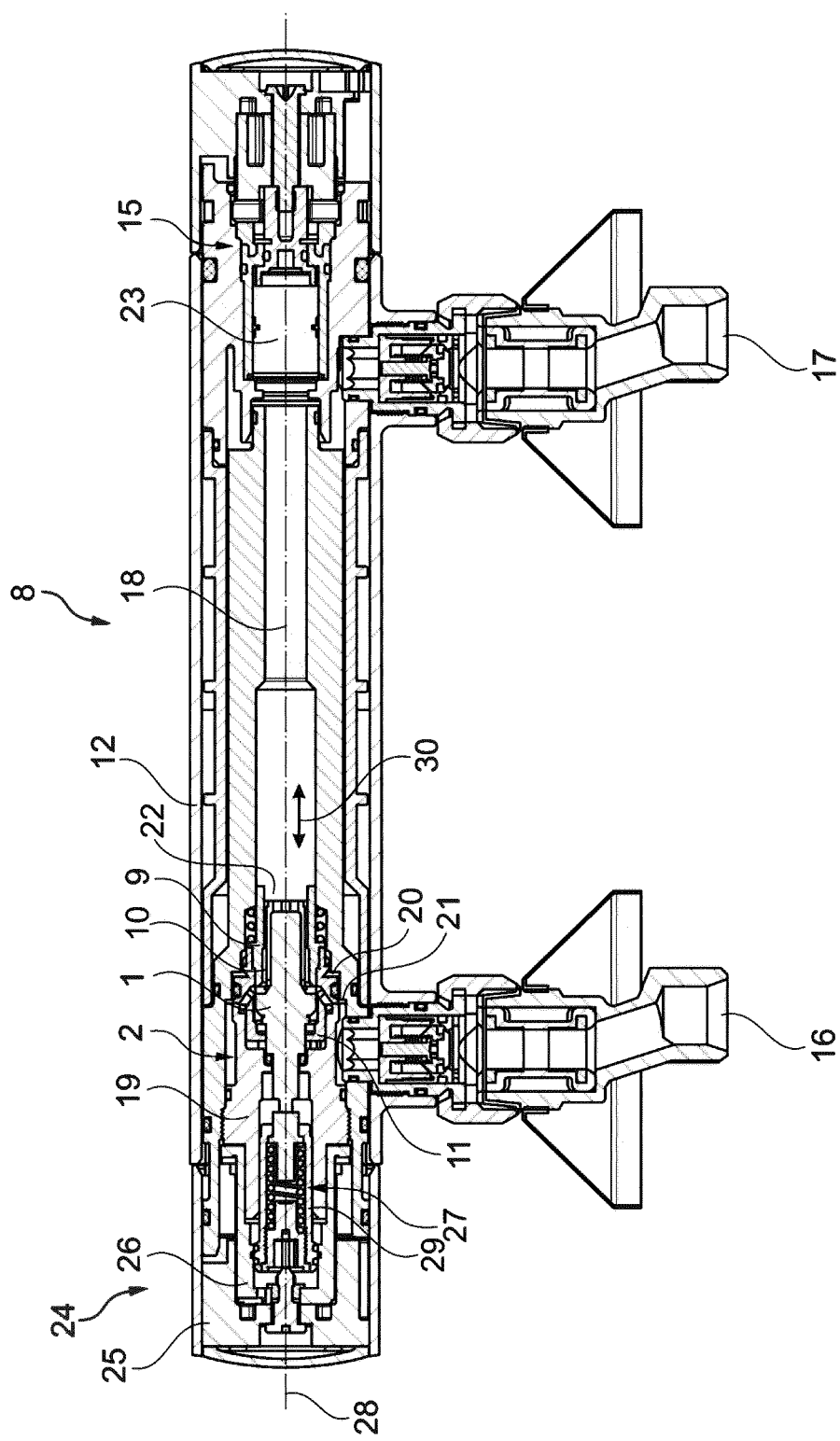

EXPANSION MATERIAL ELEMENT FOR A THERMOSTATIC MIXING VALVE

Figure 1:
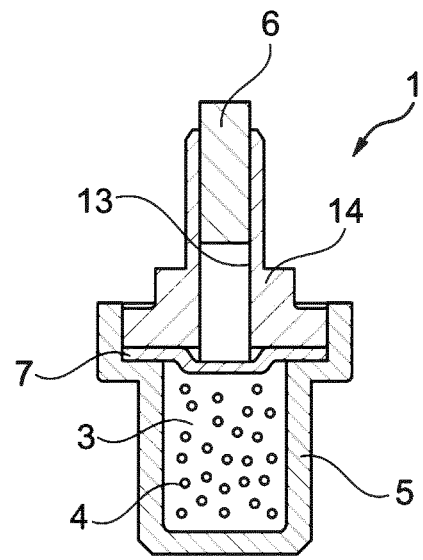

This invention relates to an expansion material element for a thermostatic valve and/or thermostatic mixing valve, a thermostatic mixing valve for a sanitary faucet and a sanitary faucet having such a thermostatic mixing valve. The expansion material element can, for instance, keep a temperature of a fluid mixed by the thermostatic mixing valve (largely) constant. Sanitary faucets are used in particular to provide the liquid, in particular water, on demand at a sink, a washbasin, a shower or a bathtub.

Known expansion material elements have an expansion material, which expands depending on an ambient temperature of the expansion material element. The expansion material can be wax, for instance. To ensure a high reaction rate of an expansion material element to changing ambient temperatures, it is known to add, for instance, copper powder or expanded graphite to the expansion material. However, there are applications for which a different reaction characteristic or temperature response of the expansion material element is desired, for which a longer service life of the expansion material element is desired, or for which the reaction rate of the known expansion material elements is not yet sufficiently high. A thermostatic valve opens or closes a fluid line, and a thermostatic mixing valve mixes two fluids or fluid flows such that a mixed fluid is delivered at a set temperature.

Therefore, the invention addresses the problem of solving at least a part of the issues described with reference to the prior art and, in particular, of providing an expansion material element for a thermostatic mixing valve that has a particularly high reaction rate. In addition, a thermostatic mixing valve for a sanitary faucet is to be specified whose expansion material element has a particularly high reaction rate. Furthermore, a sanitary faucet is to be specified whose thermostatic mixing valve has an expansion material element having a particularly high reaction rate.

These problems are solved by an expansion material element, a thermostatic mixing valve and a sanitary faucet having the features of the independent claims. Further advantageous embodiments of the invention are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

An expansion material element for a thermostatic mixing valve, which has an expansion material comprising at least one additive from the group listed below contributes to solving the problem:

synthetic graphite,
highly conductive graphite having a thermal conductivity of at least 350 W/(m×K),
boron nitride.

The expansion material element is, in particular, an actuator and/or a final control element, which can be used to convert a change in ambient temperature of the expansion material element into a (control) motion proportional to the change in ambient temperature. For this purpose, the expansion material element has an expansion material, which may be, in particular, wax, hard kerosene, alcohol or oil or a mixture of the substances mentioned. The expansion material is arranged in the expansion material element in particular such that the expansion material is separated from an environment of the expansion material element at least partially only by an outer wall of the expansion material element. The outer wall of the expansion material element consists in particular at least partially of metal, for instance stainless steel or copper or alloys thereof, and/or has a high thermal conductivity of, for instance, at least 100 W/(m×K) (watts per meter and Kelvin) at a temperature of 20° C. (Centigrade). Furthermore, the outer wall preferably has a wall thickness of 0.2 mm (millimeter) to 2 mm. It has been shown that such wall thicknesses constitute a good compromise between mechanical stability and thermal properties (thermal conductivity and thermal mass of the outer wall). When the ambient temperature changes, a volume of the expansion material changes. As the ambient temperature rises, the expansion material expands, i.e., its volume increases, and as the ambient temperature falls, the expansion material shrinks, i.e., its volume decreases. The changing volume of the expansion material results in the (adjusting) motion of the expansion material element. To ensure that this (adjusting) motion is performed with as little delay as possible, the expansion material comprises at least one additive. The additive thus increases a reaction rate of the expansion material element. In particular, the additive is mixed with the expansion material during the production of the expansion material element. For this purpose, the additive can in particular be a powder and/or particles. This allows for a (substantially) uniform distribution of the additive in the expansion material. The expansion material may contain other substances, in particular chemical substances, which "keep" the additive dissolved in the expansion material and/or prevent segregation of the additive in the expansion material.

The additive is synthetic graphite, highly conductive graphite having a thermal conductivity of at least 350 W/(m×K) and/or boron nitride. The highly conductive graphite may be graphite produced from natural graphite and, in particular, is always present as graphite in the manufacturing process. Furthermore, the highly conductive graphite may in particular not be expanded graphite or expandable graphite. In contrast to natural or mined graphite, synthetic graphite is produced (artificially) from carbon-rich starting materials that are not graphitic and, in particular, have a graphitizable basic structure or in particular can be converted into, then synthetic, graphite. The starting materials can be for instance petroleum coke, pitch coke or anthracite. The starting materials are graphitized in the absence of air in particular at temperatures of 2,500° C. to 3,000° C. In particular, the synthetic graphite has a purity or mass fraction of carbon in the range of 99.5% to 99.9995%. In addition, the synthetic graphite preferably has a thermal conductivity of 1700 W/(m×K) to 1850 W/(m×K).

The highly conductive graphite is in particular very finely ground natural flake graphite having carbon content of at least 98% with a particle size of d50 approx. 45 μm.

The boron nitride is a boron-nitrogen compound. The boron nitride preferably has a thermal conductivity of at least 350 W/(m×K). One of the distinguishing features of boron nitride compared to highly conductive and synthetic graphite is that it is not electrically conductive. This makes it possible, especially when using an electrically non-conductive outer wall, to provide an electrically non-conductive actuator that provides increased user safety against electric shock.

A joint property of synthetic graphite, highly conductive graphite and boron nitride is a very high thermal conductivity.

The additive therefore improves the thermal conductivity of the expansion material and thus the reaction rate of the expansion material element. Furthermore, the expansion material can contain a lower mass fraction of the additive at the same reaction rate compared to known expansion material elements. This can reduce the cost of the expansion material element. In addition, the expansion material element can be designed to be smaller for the same change in volume of the expansion material (for a change in ambient temperature of, for instance, 1° C.), or the expansion material can have a larger change in volume (for a change in ambient temperature of, for instance, 1° C.) for the same size of the expansion material element.

A mass fraction of the at least one additive in the expansion material can be 30% to 80%, in particular 55% to 80%, in particular 60% to 70%.

In the case of boron nitride, the at least one additive can have a mean particle size D50 of 0.4 μm (microns) to 550 μm.

In the case of synthetic graphite, the at least one additive can have a mean particle size D50 of 0.4 μm (microns) to 550 μm.

In the case of highly conductive graphite, the at least one additive can have a mean particle size D50 of 0.4 μm (microns) to 550 μm.

The expansion material may be disposed in a body of the expansion material element. In particular, the body is at least partially made of metal and/or has a high thermal conductivity of, for instance, at least 100 W/(m×K) (Watts per Meter and Kelvin) at a temperature of 20° C. (Centigrade). Furthermore, the body preferably has a wall thickness of 0.5 mm (millimeter) to 2 mm. The body can in particular be cup-shaped.

The expansion material can be used to drive a working piston of the expansion material element. In particular, this can mean that a change in volume of the expansion material results in a motion, especially linear, of the working piston. In particular, the working piston is movably arranged in a guide opening of a closure element of the housing. When the volume of the expansion material expands or increases, the working piston in particular is moved at least partially out of the guide opening. In the event of shrinkage or a reduction in the volume of the expansion material, the working piston can be moved at least partially into the guide opening, in particular by a return spring. In particular, the working piston is cylindrical and/or pin-shaped.

A diaphragm can be disposed between the expansion material and the working piston. In particular, the diaphragm can be flexible and/or clamped between the body and the closure element of the housing. In particular, the diaphragm can prevent the expansion material from escaping from the body via the guide opening of the closure element. At the same time, the diaphragm permits the working piston to be moved by the expansion material.

In accordance with another aspect of the invention, a thermostatic mixing valve for a sanitary faucet is also proposed, which has at least the items listed below:
 a body element having a mixing chamber for mixing cold water and warm water to form mixed water;
 a control element for adjusting a mixing ratio between the cold water and warm water in the mixing chamber; and
 an expansion material element according to the invention, which can be used to actuate the control element.

The thermostatic mixing valve is used in particular to mix cold water of a cold-water temperature and warm water of a warm-water temperature to form a mixed water of a desired mixed-water temperature. For this purpose, the thermostatic mixing valve has a mixing chamber in or on a body element, which is designed, for instance, in the manner of a valve body or cartridge head piece. The cold water can be supplied to the mixing chamber via at least one cold-water control gap and/or the warm water can be supplied to the mixing chamber via at least one warm-water control gap. The cold-water temperature of the cold water is in particular at most 30° C. (Centigrade), preferably at most 25° C., preferably 1° C. to 25° C., particularly preferably 5° C. to 20° C. and/or the warm-water temperature of the warm water is in particular at most 90° C., preferably 25° C. to 90° C., particularly preferably 55° C. to 65° C. Furthermore, the thermostatic mixing valve has a control element, which is designed, for instance, like a control gate valve. The control element is used to set a mixing ratio of the cold water and the warm water in the mixing chamber. For this purpose, the control element is arranged in the mixing chamber, in particular in a movable manner. Furthermore, by moving the control element, in particular a size of the at least one cold-water control gap and/or the at least one warm-water control gap can be changed. An increase of the at least one cold water control gap results in particular in a reduction of the at least one warm-water control gap and vice versa. Furthermore, the thermostatic mixing valve comprises an expansion material element according to the invention. The expansion material element permits the control element to be actuated, in particular as a function of a mixed-water temperature of the mixed water in the mixing chamber. For this purpose, the mixing water can at least partially flow around the expansion material element. For further details, please refer to the description of the expansion material element according to the invention.

According to yet a further aspect of the invention, a sanitary faucet comprising at least one faucet body and a thermostatic mixing valve according to the invention are also disclosed.

The sanitary faucet is used in particular to provide a mixed water on demand at a washbasin, a sink, a shower or a bathtub. For this purpose, the sanitary faucet has a faucet body and a thermostatic mixing valve according to the invention. In particular, the faucet body is at least partially made of plastic and/or (cast) metal, such as brass. The faucet body can be attachable to a support, such as a wall, countertop, a sink, a washbasin, a bathtub, or a shower. In addition, the sanitary faucet can have an operating element, which can be used to adjust a target mixed-water temperature of the mixed water and/or an extraction flow of the mixed water. For further details, please refer to the description of the expansion material element according to the invention and of the thermostatic mixing valve according to the invention.

Figure 2:
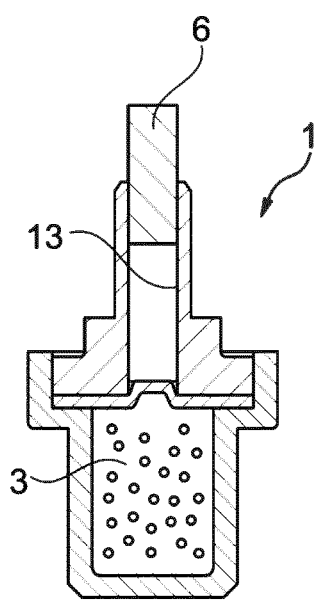

The invention and the technical environment are explained in more detail below with reference to the figures. It should be noted that the figures show a particularly preferred embodiment variant of the invention, but the invention is not limited thereto. The same reference numerals are used for the same components in the figures. In an exemplary and schematic manner FIG. 1 shows a longitudinal section of an expansion material element at a first temperature;

FIG. 2 shows a longitudinal section of the expansion material element at a second temperature; and FIG. 3 shows a sanitary faucet having a thermostatic mixing valve with the expansion material element.

FIG. 1 shows a longitudinal section of an expansion material element 1 at a first temperature. The expansion material element 1 comprises a body 5, which is cup-shaped in this case. The body 5 contains an expansion material 3, which in this case is wax and has an additive 4. The additive 4 is a powder and/or particles and mixed with the expansion material 3. The additive 4 may be synthetic graphite, highly conductive graphite having a thermal conductivity of at least X S/m and/or boron nitride. Furthermore, the expansion material element has a working piston 6, which is separated from the expansion material 3 by a flexible diaphragm 7. The working piston 6 is guided in a guide opening 13 of a closure element 14, such that the working piston 6 can be pressurized by the expansion material 3 in the guide opening 13.

FIG. 2 shows a longitudinal section of the expansion material element 1 at a second temperature. Because the second temperature is higher than the first temperature, the expansion material 3 has expanded compared to the condition shown in FIG. 1 and has driven the working piston 6 some way out of the guide opening 13. As the temperature drops, the volume of the expansion material 3 shrinks and the working piston 6 can be returned, for instance by a return spring (not shown here).

FIG. 3 shows a longitudinal section of a sanitary faucet 8, which can be used in a shower, for instance. The sanitary faucet 8 comprises a faucet body 12 having a thermostatic mixing valve 2 with the expansion material element 1 shown in FIGS. 1 and 2 and a valve 15. The faucet body 12 can be supplied with cold water via a cold-water intake 16 and with warm water via a warm-water intake 17. The cold water and the warm water can be supplied to the thermostatic mixing valve 2 through fluid channels formed in the faucet body 12. The thermostatic mixing valve 2 can mix the cold water and the warm water to form a mixed water having a desired mixed-water temperature. The thermostatic mixing valve 2 has a body element 9 that is (substantially) tubular in shape and extends along a longitudinal axis 18 of the thermostatic mixing valve 2 or along the faucet body 12 of the sanitary faucet 8. At least one warm-water inlet 20 and at least one cold-water inlet 21 are formed in the cartridge head piece 19 of the thermostatic mixing valve 2. The embodiment variant of the thermostatic mixing valve 2 shown here has a plurality of warm-water inlets 20 and cold-water inlets 21 distributed in a circumferential direction about the longitudinal axis 18 of the cartridge head piece 19. The warm water can be routed into a mixing chamber 10 of the thermostatic mixing valve 2 via the warm-water inlets 20 and the cold-water inlets 21. Consequently, the mixing chamber 10 is disposed downstream of the warm-water inlets 20 and of the cold-water inlets 21. The warm water and the cold water can at least partially be mixed to a mixed water at a mixed-water temperature in the mixing chamber 10. A mixed water outlet 22, through which the mixed water of the mixed-water temperature can exit the thermostatic mixing valve 2, is disposed downstream of the mixing chamber 10. From the mixed water outlet 22, the mixed water can be supplied to the valve 15, the valve body 23 of which can be used to control a discharge of the mixed water from the sanitary faucet 8.

The mixed-water temperature of the mixed water is determined by a mixing ratio between the warm water and the cold water and a warm-water temperature of the warm water and a cold-water temperature of the cold water. The thermostatic mixing valve 2 has an operating element 24 for adjusting the mixed-water temperature. The operating element 24 comprises an actuating handle 25, which is connected in a non-rotatable manner to a control nut 26 of an overload unit 27. The actuating handle 25 including the control nut 26 can thus be rotated about an axis of rotation 28, which in this case is identical to the longitudinal axis 18.

When the actuating handle 25 is rotated, a spring sleeve 29 is moved in an axial direction 30, i.e. in parallel to the longitudinal axis 18. The motion of the spring sleeve 29 in the axial direction 30 is transmitted to an expansion material element 1, which in turn moves a control element 11 in the way of a control gate valve in the axial direction 30. Depending on the position of the control element 11 in the axial direction 30, the control element 11 can alternately open and close a warm-water control gap (not visible here) and a cold-water control gap (not visible here). Depending on the position of the control gate valve 11, a matching amount of warm water and cold water is routed to the thermostatic mixing valve 2 through the warm-water control gap and the cold-water control gap, from which the mixed water is mixed for a corresponding mixed-water temperature. Owing to the expansion material 3 of the expansion material element 1 shown in FIGS. 1 and 2, the control element 11 can be actuated by the working piston 6 of the expansion material element 1, also shown in FIGS. 1 and 2, in such a way that the mixed water is kept at a (largely) constant mixed-water temperature. If, for instance, too much warm water or too little cold water flows into the thermostatic mixing valve 2, the expansion material 3 of the expansion material element 1 heats up and expands, causing it to move the control element 11 in the axial direction 30 towards the mixed-water outlet 22, decreasing the size of the warm-water control gap and increasing the size of the cold-water control gap. Then, less warm water and more cold water flows into the mixing chamber 10. If, for instance, too much cold water or too little warm water flows into the thermostatic mixing valve 2, the expansion material 3 of the expansion material element 1 contracts, causing the expansion material element 1 to move the control element 11 away from the mixed water outlet 22, increasing the size of the warm-water control gap and decreasing the size of the cold-water control gap. Then, more warm water and less cold water flows into the mixing chamber 10.

This invention renders achieving a particularly high reaction rate of an expansion material element possible.

LIST OF REFERENCE NUMERALS 1 expansion material element
 2 thermostatic mixing valve
 3 expansion material
 4 additive
 5 body
 6 working piston
 7 diaphragm
 8 sanitary faucet
 9 body element
10 mixing chamber
11 control element
12 faucet body
13 guide opening
14 closure element
15 valve
16 cold-water intake
17 warm-water intake
18 longitudinal axis
19 cartridge head piece
20 warm-water inlet
21 cold-water inlet
22 mixed-water outlet
23 valve body
24 operating element
25 actuating handle 26 control nut
27 overload unit
28 axis of rotation
29 spring sleeve
30 axial direction

The invention claimed is:

1. An expansion material element (1) for a thermostatic valve or a thermostatic mixing valve (2), having an expansion material (3) comprising at least one additive (4) from the group below:
   synthetic graphite,
   highly conductive graphite having a thermal conductivity of at least 350 W/(m×K), and boron nitride,
   wherein a mass fraction of the at least one additive (4) in the expansion material (3) is 50% to 80%.

2. The expansion material element (1) according to claim 1, wherein the at least one additive (4) has a mean particle size D50 of 0.4 μm to 550 μm.

3. The expansion material element (1) according to claim 1, wherein the expansion material (3) is disposed in a body (5) of the expansion material element (1).

4. The expansion material element (1) according to claim 1, wherein the expansion material (3) is used to drive a working piston (6) of the expansion material element (1).

5. The expansion material element (1) according to claim 4, wherein a diaphragm (7) is disposed between the expansion material (3) and the working piston (6).

6. A sanitary faucet (8), comprising a faucet body (12) and a thermostatic mixing valve (2),
   wherein the thermostatic mixing valve (2) comprises:
   a body element (9) having a mixing chamber (10) for mixing cold water and warm water to form mixed water;
   a control element (11) for adjusting a mixing ratio between the cold water and warm water in the mixing chamber (10); and
   the expansion material element (1) according to claim 1, which can be used to actuate the control element (11).

* * * * *